United States Patent
Indurkar

(10) Patent No.: US 11,229,004 B1
(45) Date of Patent: Jan. 18, 2022

(54) SYSTEM AND METHOD OF ACCESS POINT NAME (APN) DYNAMIC MAPPING

(71) Applicant: T-MOBILE INNOVATIONS LLC, Overland Park, KS (US)

(72) Inventor: Dhananjay Indurkar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 5 days.

(21) Appl. No.: 16/929,993

(22) Filed: Jul. 15, 2020

(51) Int. Cl.
*H04W 68/00* (2009.01)
*H04M 15/00* (2006.01)
*H04W 88/16* (2009.01)
*H04W 76/11* (2018.01)

(52) U.S. Cl.
CPC ......... *H04W 68/005* (2013.01); *H04M 15/66* (2013.01); *H04W 76/11* (2018.02); *H04W 88/16* (2013.01)

(58) Field of Classification Search
CPC ... H04W 68/005; H04W 76/11; H04W 88/16; H04M 15/66
See application file for complete search history.

(56) References Cited

U.S. PATENT DOCUMENTS

| | | | |
|---|---|---|---|
| 9,622,143 B1* | 4/2017 | Sankaran | H04L 12/4604 |
| 2014/0198637 A1* | 7/2014 | Shan | H04L 47/12 370/229 |
| 2018/0160311 A1* | 6/2018 | Shaw | H04L 61/2007 |
| 2019/0053291 A1* | 2/2019 | Mukherjee | H04W 12/72 |
| 2021/0105214 A1* | 4/2021 | Goel | H04L 65/1033 |

* cited by examiner

*Primary Examiner* — Saad A. Waqas

(57) ABSTRACT

A method of data communication service to a wireless communication device, comprising receiving a first communication session initiation message by a communication gateway from a wireless communication device, wherein the first communication session initiation message provides no access point name (APN) or provides a default APN, based on the first communication session initiation message providing no APN or providing a default APN, sending the first communication session initiation message by the communication gateway to an APN allocation server, parsing the first communication session initiation message by the APN allocation server to determine a destination identity of the first communication session initiation message and to determine an identity of the wireless communication device, looking up a communication policy by the APN allocation server, looking up by the APN allocation server an APN associated with the communication policy, sending the APN by the APN allocation server to the wireless communication device.

18 Claims, 3 Drawing Sheets

SYSTEM AND METHOD OF ACCESS POINT NAME (APN) DYNAMIC MAPPING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless communication devices may complete an authentication process with a cell site to obtain a wireless communication link from the cell site and access to the radio access network that the cell site is a part of. This may involve the wireless communication device radio transceiver obtaining network access keys or network access credentials from a subscriber identity module (SIM) and providing those network access keys or network access credentials to the cell site. The SIM may be a smart card, also known as a universal integrated circuit card (UICC), that which comprises memory and a processor. SIM cards may be removable in some circumstances, for example in traditional mobile phones. By removing a first SIM card and installing a second SIM card in a mobile phone, a user may change his or her service provider network. Removable SIM cards may not be provided in some wireless communication devices, where the role of the SIM card is instead performed by an embedded universal integrated circuit card (eUICC) comprising an embedded SIM (eSIM), that which may be provisioned with network access keys and/or network access credentials, one or more access point names (APNs), a preferred roaming list (PRL), branding information, applications, and other data artifacts. The radio transceiver may then obtain the network access keys or network access credentials from the UICC and provide those network access keys or network access credentials to the cell site to obtain a wireless communication link.

SUMMARY

In an embodiment, a method of data communication service to a wireless communication device. The method comprising receiving a first communication session initiation message by a communication gateway from a wireless communication device, wherein the first communication session initiation message provides no APN or provides a default APN. The method, based on the first communication session initiation message providing no APN or providing a default APN, further comprises sending the first communication session initiation message by the communication gateway to an APN allocation server. The method further comprises receiving the first communication session initiation message by the APN allocation server from the communication gateway, and parsing the first communication session initiation message by the APN allocation server to determine a destination identity of the first communication session initiation message and to determine an identity of the wireless communication device. The method, based on the destination identity of the first communication session initiation message and based on the identity of the wireless communication device, comprises looking up a communication policy by the APN allocation server. The method, based on the communication policy, comprises looking up by the APN allocation server a first APN associated with the communication policy. The method further comprises sending the first APN by the APN allocation server to the wireless communication device, and receiving a second communication session initiation message by the communication gateway from the wireless communication device, wherein the second communication session initiation message provides the first APN. The method further comprises routing the second communication session initiation message by the communication gateway to a communication service based on the first APN, whereby the wireless communication device is dynamically provided a communication session without statically configuring an APN in the wireless communication device.

In another embodiment, an APN allocation server comprises a processor, a non-transitory memory, and an APN allocation application stored in the non-transitory memory. When the instructions are executed by the processor, the APN server receives a communication session initiation message from a communication gateway, and parses the communication session initiation message to determine a destination identity of the communication session initiation message and to determine an identity of a wireless communication device. The APN server, based on the destination identity of the communication session initiation message and based on the identity of the wireless communication device, looks up a communication policy in the non-transitory memory. The APN server, based on the communication policy, looks up a first APN associated with the communication policy, and sends the first APN by the APN to the wireless communication device.

In yet another embodiment, a wireless communication device comprises a radio transceiver, a processor, a non-transitory memory, and a wireless communication application. The wireless communication application is stored in the non-transitory memory that, when executed by the processor sends a first communication session initiation message via the radio transceiver to a communication gateway, wherein the first communication session initiation message comprises a destination identity and a default APN. The wireless communication device further receives a response message via the radio transceiver, wherein the response message comprises a first APN. The wireless communication device further sends a second communication session initiation message via the radio transceiver to the communication gateway, wherein the second communication session initiation message comprises the first APN, whereby the wireless communication device is dynamically provided a communication session without statically configuring an APN in the wireless communication device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
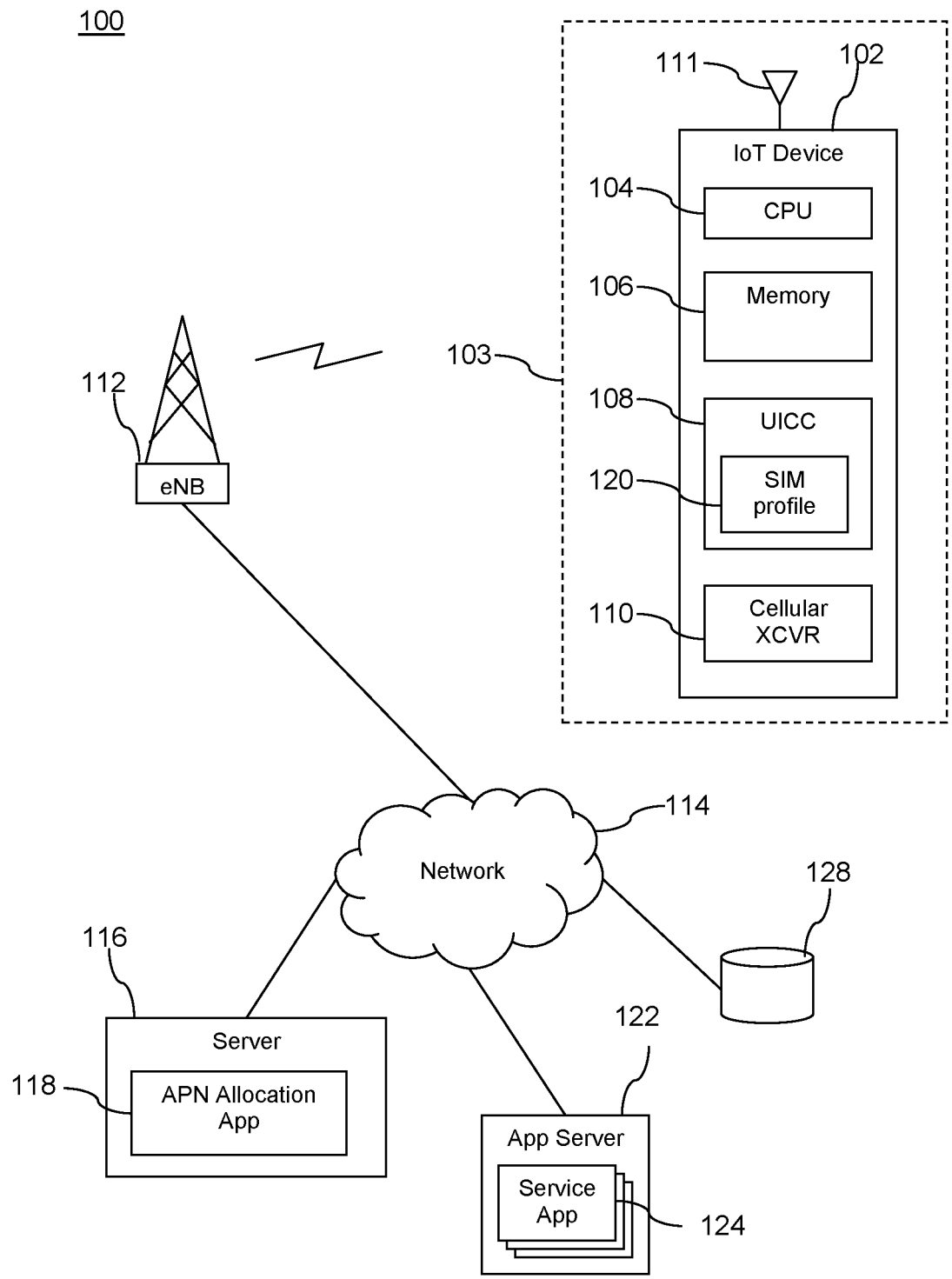
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

While this description is focused on IoT devices, the teachings about dynamic APN allocation could be applied to other wireless communications devices without departing from the spirit or scope of the present disclosure. For example, this application could be applied to a mobile phone, a cell phone, a smart phone, a wearable computer, laptop computer, a tablet computer, a notebook computer, and/or the like.

It is desirable to free Internet of Things (IoT) devices, and other more traditional devices, from being configured or activated with a fixed APN. An APN, in effect, designates a named path for traffic flowing in the core network, effectively designating a network within the core network. Traffic traversing the core network using different APNs may be monitored and managed differently according to different policies and a quality of service (QoS) associated with each different APN.

This disclosure proposes a server to which the IoT device communication is automatically routed. For example, the IoT device initiates a session without designating an APN, and the Radio Access Network (RAN) routes the message to the server. The IoT device requests a communication session designating a desired endpoint for the communication, where the endpoint designates a receiver of the message. For example the endpoint may designate the receiver of the message by an Internet Protocol address, a fully qualified domain name (FQDN), a uniform resource locator (URL), or other identification. The server consults a policy that has been configured into it and looks up an appropriate APN based on the desired endpoint and the policy which is appropriate for the IoT device. The policy may be selected based on a wireless communication subscription plan associated with the IoT device. The server returns the appropriate APN to the IoT device. The IoT device, or different IoT devices, may indicate the same endpoint at a different time, but may be assigned different appropriate APNs with respect to resource allocation by the RAN. Additionally, different IoT devices may indicate the same endpoint at a same time, but may be assigned different appropriate APNs with respect to resource allocation by the RAN. When the IoT device receives the appropriate APN, the IoT device sends another message containing the designation of the endpoint, a service request identity, and the appropriate APN. The IoT device sends this message to the cell site. The cell site sends the message to a gateway server. The gateway server parses the message, finds the appropriate APN, and then moves the message along a communication path defined by the appropriate APN to the endpoint (e.g., an application server) designated by the message. The appropriate APN may be used by the IoT device for the duration of the communication session and then discarded. When the IoT device again initiates a communication session, the foregoing APN assignment process may be repeated.

This approach supports great flexibility when changes may occur such as mergers of different wireless enterprises, changes of policy within the same wireless enterprise, and/or the like. This can obviate making widespread updates by cellular service providers to deployed IoT devices based on the ability to target the deployed IoT devices with the dynamic APN allocation method herein.

In one embodiment, the APN may be provided to the IoT device with a time-to-live value, where the IoT device caches the APN and continues to use it in a series of communication sessions until the time-to-live expires, or may discard the APN when the time-to-live expires. In another embodiment, the server may send the APN and the time-to-live value to the IoT device in a Short Message Service (SMS) message and hence out-of-channel.

Dynamically assigning an APN could be advantageous as introduced in the following examples. In a first example, an IoT device associated with a vending machine, such as a snack vending machine, located in a college campus building may be given a first APN for communicating to an application server to report inventory present in the vending machine during the week. When a football game is scheduled at the proximate football stadium, IoT device associated with a vending machine may be given a second APN for communicating to the application server to report inventory. The second APN may be associated with a lower priority of handling and/or a lower quality of service (QoS) handling, whereby communication resources that would otherwise be consumed by the IoT device (and other like IoT devices also proximate to the football stadium) are instead made available to serve an expected heavy load of smart phone communication on the part of spectators at the football stadium before and during the game. In a second example, an IoT device associated with an HVAC system installed in a city building may be given a third APN for communicating to an application server to report status of the HVAC system. When a severe weather event happens in the area, the IoT device associated with the HVAC system may be given a fourth APN for communicating, where the fourth APN may be associated with a lower priority of handling and/or a lower QoS handling, whereby communication resources that would otherwise be consumed by the IoT device (and other like IoT devices also located in the area that experienced severe weather) are instead made available to first responders and residents who may be expected to use their wireless communication devices more than usual. These changed allocations of APNs to the IoT devices in these two examples can be done conveniently, ad hoc, and selectively using the system described herein.

In FIG. 1, a system 100 is described. In an embodiment, the system 100 comprises an IoT wireless communication module (e.g., an IoT device) 102 attached to or installed in a system or appliance 103. The IoT device 102 comprises a processor 104, a memory 106, a UICC 108, a cellular radio transceiver 110, and an antenna 111. A portion of the memory 106 may be a non-transitory memory and a portion of the memory 106 may be a transitory memory. When properly activated and provisioned with an eSIMa SIM profile 120, the IoT device 102 may be able to establish a wireless communication link to a RAN, for example to a cell site 112. The cell site 112 provides the IoT device 102 a communication link to a network 114. The network 114 is one or more public networks, one or more private networks, or a combination thereof. The IoT device 102 communicates via the cell site 112 and via the network 114 to a server 116 communicatively coupled to the network 114 and to an APN allocation application 118 that executes on the server 116. Communication between the IoT device 102 and the APN allocation application 118 allows the IoT device 102 to perform a communication service for the appliance 103.

The appliance 103 may be a refrigerator, a vending machine, a heating ventilation and air conditioning (HVAC) system, a remote sensor, a remote control device, or other kind of appliance or system. The cellular radio transceiver 110 may be able to establish wireless communication with the cell site 112 via the antenna 111 based on a 5G, a Long-Term Evolution (LTE), a code division multiple access (CDMA), or a Global System for Mobile Communications (GSM) telecommunications protocol. While a single IoT device 102 in a single appliance 103 is illustrated in FIG. 1, it is understood that the system 100 may comprise any number of appliances 103 and IoT devices 102. While one IoT device 102 is illustrated as present in appliance 103, in an embodiment, the appliance 103 may have two or more IoT devices 102 attached to or installed in.

The communication service provided to the IoT device 102 by the cell site 112 and/or by the network 114 is based on an endpoint with which the IoT device 102 intends to communicate, and a subscription plan associated with the IoT device 102, when the IoT device 102 does not store an APN to request a wireless communication link from the cell site 112. In an embodiment, the IoT device 102 initiates a session with the cell site 112 by sending a message without designating an APN, and the cell site 112 determines the message does not comprise an APN and routes the message to the server 116. The server 116 prompts an APN allocation application 118 to consult a policy that has been configured into it and looks up an appropriate APN from a database 128 based on the desired endpoint and the policy that is appropriate for the IoT device 102. The server 116 returns the APN to the IoT device 102. When the IoT device 102 receives the APN, the IoT device 102 sends another message to the cell site 112 containing the designation of the endpoint, a service request identity, and the APN. The cell site 112 sends the message to the network 114, and the network 114 (e.g., a gateway of the network 114) sends the message to the app server 122 identified by the endpoint following a path through the network 114 identified by the APN, which in turn executes a service app 124 running on the app server 122.

Alternatively, in an embodiment the eSIM 120 first identifies whether the IoT device 102 comprises an APN. When the IoT device 102 asserts there is no APN, and instead responds with the desired endpoint for communication, the eSIM 120 allocates a wildcard APN to initially access the network 114 through the cell site 112. The IoT device sends the wildcard APN to the cell site 112. The cell site 112 receives the wildcard APN and routes the message to the server 116. The server 116 uses the APN allocation application 118 to consult a policy and looks up an appropriate APN from a database 128 based on the desired endpoint and the policy that is appropriate for the IoT device. The server 116 returns the APN to the IoT device 102. When the IoT device 102 receives the APN, the IoT device 102 then sends another message to the cell site 112 containing the designation of the endpoint, a service request identity, and the APN. The cell site 112 sends to the network 114, and the network 114 (e.g., a gateway of the network 114) sends the message to the app server 122 identified by the endpoint following a path through the network 114 identified by the APN, which in turn executes a service app 124 running on the app server 122.

In another embodiment, the IoT device 102 initiates a session with the cell site 112 by sending a message without designating an APN, and the cell site 112 determines the message does not comprise an APN and routes the message to the server 116. The server 116 prompts the APN allocation application 118 to consult a policy that has been configured into it and looks up an appropriate APN from a database 128 based on a subscription plan associated with the IoT device 102 and the policy that is appropriate for the IoT device 102. The server 116 returns the APN to the IoT device 102. When the IoT device 102 receives the APN, the IoT device 102 then sends another message to the cell site 112 containing the designation of an endpoint, a service request identity, and the APN. The cell site 112 sends to the network 114, and the network 114 (e.g., a gateway of the network 114) sends the message to the app server 122 identified by the endpoint following a path through the network 114 identified by the APN, which in turn executes a service app 124 running on the app server 122.

In another embodiment, the IoT device 102 initiates a session with the cell site 112 by sending a message without designating an APN, and the cell site 112 determines the message does not comprise an APN and routes the message to the server 116. The server 116 prompts the APN allocation application 118 to consult a policy that has been configured into it and looks up an appropriate APN from a database 128 based on the desired endpoint and the policy that is appropriate for the IoT device 102. The server 116 returns the APN to the IoT device 102 with a "time-to-live." When the IoT device 102 receives the APN, the IoT device 102 sends another message to the cell site 112 containing the desired endpoint, a service request identity, and the appropriate APN. The cell site 112 sends to the network 114, and the network 114 (e.g., a gateway of the network 114) sends the message to the app server 122 identified by the endpoint following a path through the network 114 identified by the APN, which in turn executes a service app 124 running on the app server 122. The time-to-live value indicates the time in which the APN will be active for the IoT device 102 to use. The IoT device 102 caches the APN and continues to use it in a series of communication sessions until the time-to-live expires, or may discard the APN when the time-to-live expires. The IoT device 102 performs another iteration of the foregoing process when the time-to-live expires and the IoT device 102 discards the APN.

In another embodiment, the IoT device 102 initiates a session with the cell site 112 by sending a message without designating an APN, and the cell site 112 determines the message does not comprise an APN and routes the message to the server 116. The server 116 prompts the APN allocation application 118 to consult a policy that has been configured into it and looks up an appropriate APN from a database 128 based on the desired endpoint of the IoT device 102, the policy that is appropriate for the IoT device 102, and a security preference of the RAN. The server 116 returns the APN to the IoT device 102. When the IoT device 102 receives the APN, the IoT device 102 sends another message to the cell site 112 containing the designation of an endpoint, a service request identity, and the APN. The cell site 112 sends to the network 114, and the network 114 (e.g., a gateway of the network 114) sends the message to the app server 122 identified by the endpoint following a path through the network 114 identified by the APN, which in turn executes a service app 124 running on the app server 122.

After the communication session described above, the APN allocation application 118 may change the APN allocated for a communication session of the IoT device 102 going forwards for a variety of reasons. The APN application 118 may change the APN allocation for the IoT device 102 because a subscription plan changes, because a policy changes, because an event (football game, severe weather event) occurs.

Figure 2:
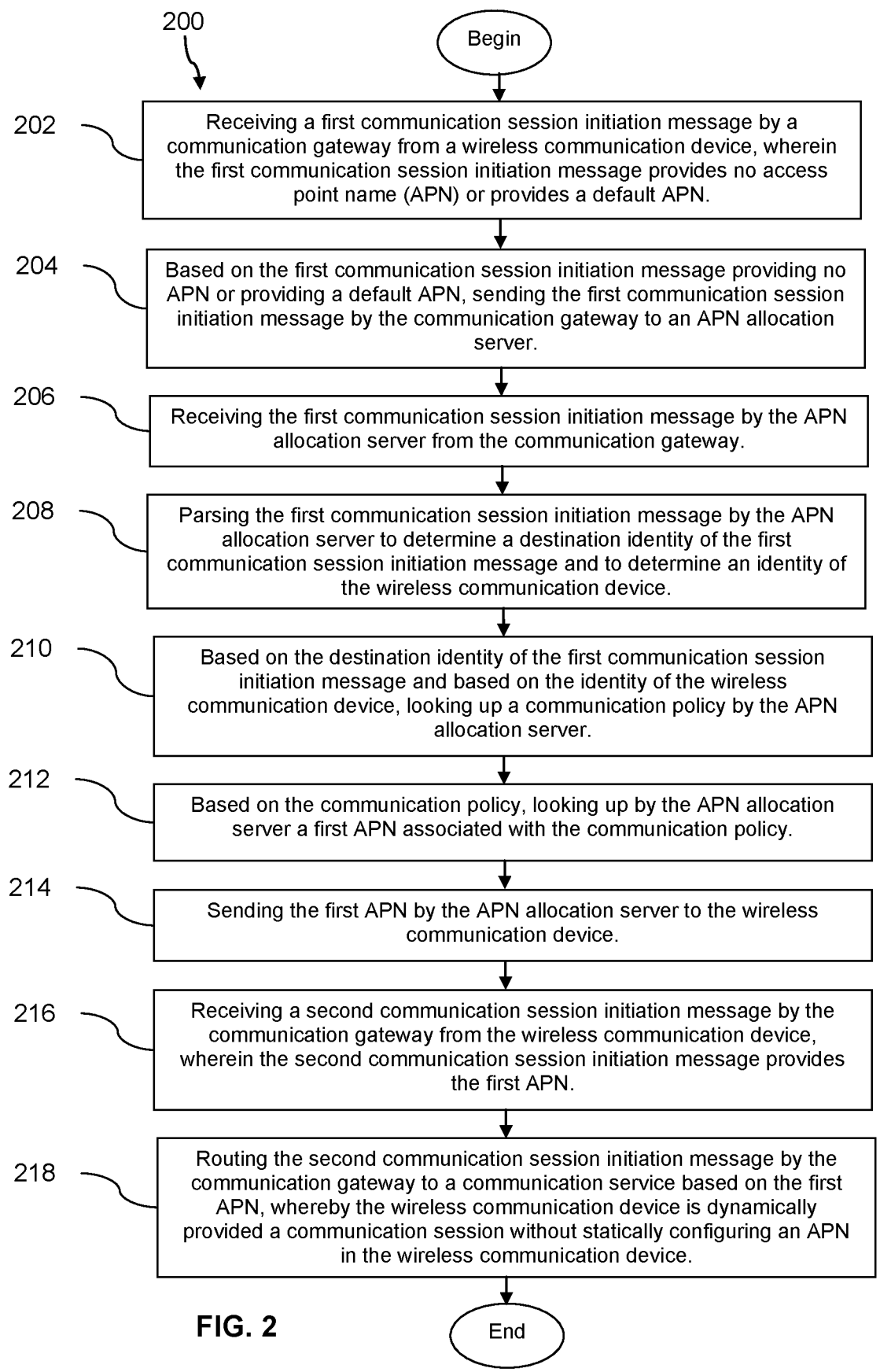
FIG. 2 is a flow chart of a method according to an embodiment of the disclosure.

Turning now to FIG. 2, a method 200 is described. In an embodiment, the method 200 is a method of dynamically allocating an APN for a wireless communication device such as an IoT device. At block 202, the method 200 comprises receiving a first communication session initiation message by a communication gateway from a wireless communication device, wherein the first communication session initiation message provides no APN or provides a default APN. In an embodiment, the processing of block 202 may comprise determining whether the APN is stored locally on the IoT device, and assigning the default APN to the IoT device when there is no APN stored locally.

At block 204, the method 200 comprises based on the first communication session initiation message providing no APN or providing a default APN, sending the first communication session initiation message by the communication gateway to an APN allocation server. The processing of block 204 may comprise communicating with a cell site before sending the first communication session initiation message to the APN allocation server. At block 206, the method 200 comprises receiving the first communication session initiation message by the APN allocation server from the communication gateway.

At block 208, the method 200 comprises parsing the first communication session initiation message by the APN allocation server to determine a destination identity of the first communication session initiation message and to determine an identity of the wireless communication device. In an embodiment, the destination identity is based on an endpoint to which the IoT device will communicate. In another embodiment, the identity of the IoT device is based on a type of a subscription plan associated with IoT device.

At block 210, the method 200 comprises based on the destination identity of the first communication session initiation message and based on the identity of the wireless communication device, looking up a communication policy by the APN allocation server. In an embodiment, the communication policy is further based on a security preference of the RAN and may be looked up based on a subscription service associated with the identity of the IoT device. The security preference of the RAN may be variable, and change according to unexpected events, whether the service of the customer requires a virtual private network, and/or the like.

At block 212, the method 200 comprises based on the communication policy, looking up by the APN allocation server a first APN associated with the communication policy. At block 214, the method 200 comprises sending the first APN by the APN allocation server to the wireless communication device.

At block 216, the method 200 comprises receiving a second communication session initiation message by the communication gateway from the wireless communication device, wherein the second communication session initiation message provides the first APN.

At block 218, the method 200 comprises routing the second communication session initiation message by the communication gateway to a communication service based on the first APN, whereby the wireless communication device is dynamically provided a communication session without statically configuring an APN in the wireless communication device.

Figure 3:
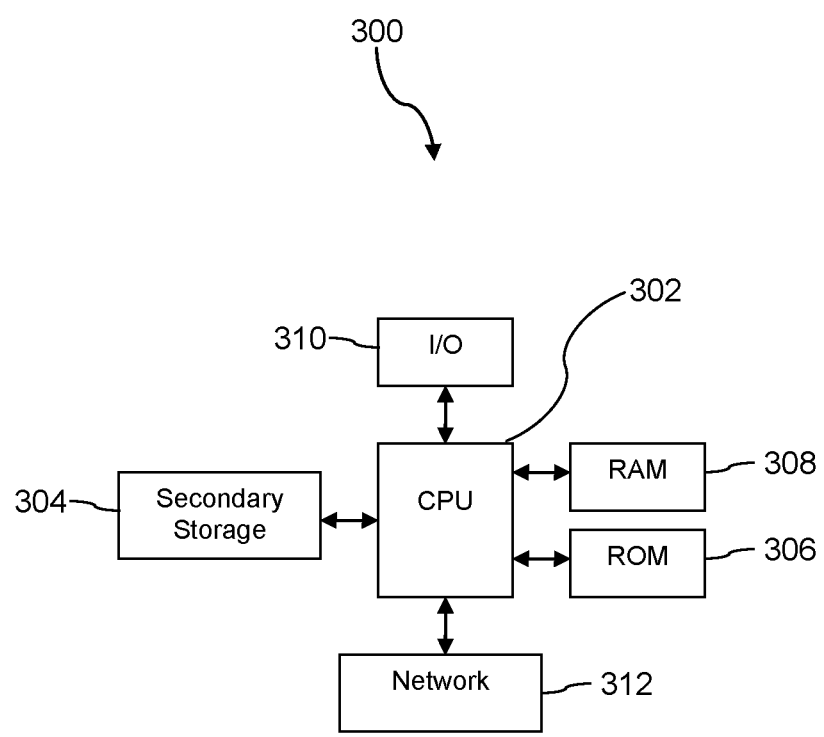
FIG. 3 is a block diagram of a computer system according to an embodiment of the disclosure.

FIG. 3 illustrates a computer system 300 suitable for implementing one or more embodiments disclosed herein. For example, in an embodiment, the server 116 and the app server 122 described above may be implemented in a form similar to that of computer system 300. The computer system 300 includes a processor 302 (which may be referred to as a central processor unit or CPU) that is in communication with memory devices including secondary storage 304, read only memory (ROM) 306, random access memory (RAM) 308, input/output (I/O) devices 310, and network connectivity devices 312. The processor 302 may be implemented as one or more CPU chips.

It is understood that by programming and/or loading executable instructions onto the computer system 300, at least one of the CPU 302, the RAM 308, and the ROM 306 are changed, transforming the computer system 300 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 300 is turned on or booted, the CPU 302 may execute a computer program or application. For example, the CPU 302 may execute software or firmware stored in the ROM 306 or stored in the RAM 308. In some cases, on boot and/or when the application is initiated, the CPU 302 may copy the application or portions of the application from the secondary storage 304 to the RAM 308 or to memory space within the CPU 302 itself, and the CPU 302 may then execute instructions that the application is comprised of. In some cases, the CPU 302 may copy the application or portions of the application from memory accessed via the network connectivity devices 312 or via the I/O devices 310 to the RAM 308 or to memory space within the CPU 302, and the CPU 302 may then execute instructions that the application is comprised of. During execution, an application may load instructions into the CPU 302, for example load some of the instructions of the application into a cache of the CPU 302. In some contexts, an application that is executed may be said to configure the CPU 302 to do something, e.g., to configure the CPU 302 to perform the function or functions promoted by the subject application. When the CPU 302 is configured in this way by the application, the CPU 302 becomes a specific purpose computer or a specific purpose machine.

The secondary storage 304 is typically comprised of one or more disk drives or tape drives and is used for non-volatile storage of data and as an over-flow data storage device if RAM 308 is not large enough to hold all working data. Secondary storage 304 may be used to store programs which are loaded into RAM 308 when such programs are selected for execution. The ROM 306 is used to store instructions and perhaps data which are read during program execution. ROM 306 is a non-volatile memory device which typically has a small memory capacity relative to the larger memory capacity of secondary storage 304. The RAM 308 is used to store volatile data and perhaps to store instructions. Access to both ROM 306 and RAM 308 is typically faster than to secondary storage 304. The secondary storage 304, the RAM 308, and/or the ROM 306 may be referred to in some contexts as computer readable storage media and/or non-transitory computer readable media.

I/O devices 310 may include printers, video monitors, liquid crystal displays (LCDs), touch screen displays, keyboards, keypads, switches, dials, mice, track balls, voice recognizers, card readers, paper tape readers, or other well-known input devices.

It is understood that by programming and/or loading executable instructions onto the computer system 300, at least one of the CPU 302, the RAM 308, and the ROM 306 are changed, transforming the computer system 300 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC) or a field programmable gate array (FPGA), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 300 is turned on or booted, the CPU 302 may execute a computer program or application. For example, the CPU 302 may execute software or firmware stored in the ROM 306 or stored in the RAM 308. In some cases, on boot and/or when the application is initiated, the CPU 302 may copy the application or portions of the application from the secondary storage 304 to the RAM 308 or to memory space within the CPU 302 itself, and the CPU 302 may then execute instructions that the application is comprised of. In some cases, the CPU 302 may copy the application or portions of the application from memory accessed via the network connectivity devices 312 or via the I/O devices 310 to the RAM 308 or to memory space within the CPU 302, and the CPU 302 may then execute instructions that the application is comprised of. During execution, an application may load instructions into the CPU 302, for example load some of the instructions of the application into a cache of the CPU 302. In some contexts, an application that is executed may be said to configure the CPU 302 to do something, e.g., to configure the CPU 302 to perform the function or functions promoted by the subject application. When the CPU 302 is configured in this way by the application, the CPU 302 becomes a specific purpose computer or a specific purpose machine.

The secondary storage 304 is typically comprised of one or more disk drives or tape drives and is used for non-volatile storage of data and as an over-flow data storage device if RAM 308 is not large enough to hold all working data. Secondary storage 304 may be used to store programs which are loaded into RAM 308 when such programs are selected for execution. The ROM 306 is used to store instructions and perhaps data which are read during program execution. ROM 306 is a non-volatile memory device which typically has a small memory capacity relative to the larger memory capacity of secondary storage 304. The RAM 308 is used to store volatile data and perhaps to store instructions. Access to both ROM 306 and RAM 308 is typically faster than to secondary storage 304. The secondary storage 304, the RAM 308, and/or the ROM 306 may be referred to in some contexts as computer readable storage media and/or non-transitory computer readable media.

I/O devices 310 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 312 may take the form of modems, modem banks, Ethernet cards, Universal Serial Bus (USB) interface cards, serial interfaces, token ring cards, fiber distributed data interface (FDDI) cards, wireless local area network (WLAN) cards, radio transceiver cards, and/or other well-known network devices. The network connectivity devices 312 may provide wired communication links and/or wireless communication links (e.g., a first network connectivity device 312 may provide a wired communication link and a second network connectivity device 312 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), Global System for Mobile Communications (GSM), LTE, WI-FI (IEEE 802.11), BLUETOOTH, ZIGBEE, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 312 may enable the processor 302 to communicate with the Internet or one or more intranets. With such a network connection, it is contemplated that the processor 302 might receive information from the network, or might output information to the network in the course of performing the above-described method steps. Such information, which is often represented as a sequence of instructions to be executed using processor 302, may be received from and outputted to the network, for example, in the form of a computer data signal embodied in a carrier wave.

Such information, which may include data or instructions to be executed using processor 302 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 302 executes instructions, codes, computer programs, scripts which it accesses from hard disk, floppy disk, optical disk (these various disk based systems may all be considered secondary storage 304), flash drive, ROM 306, RAM 308, or the network connectivity devices 312. While only one processor 302 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 304, for example, hard drives, floppy disks, optical disks, and/or other device, the ROM 306, and/or the RAM 308 may be referred to in some contexts as non-transitory instructions and/or non-transitory information.

In an embodiment, the computer system 300 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 300 to provide the functionality of a number of servers that is not directly bound to the number of computers in the computer system 300. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 300, at least portions of the contents of the computer program product to the secondary storage 304, to the ROM 306, to the RAM 308, and/or to other non-volatile memory and volatile memory of the computer system 300. The processor 302 may process the executable instructions and/or data structures in part by directly accessing the computer program product, for example by reading from a CD-ROM disk inserted into a disk drive peripheral of the computer system 300. Alternatively, the processor 302 may process the executable instructions and/or data structures by remotely accessing the computer program product, for example by downloading the executable instructions and/or data structures from a remote server through the network connectivity devices 312. The computer program product may comprise instructions that promote the loading and/or copying of data, data structures, files, and/or executable instructions to the secondary storage 304, to the ROM 306, to the RAM 308, and/or to other non-volatile memory and volatile memory of the computer system 300.

In some contexts, the secondary storage 304, the ROM 306, and the RAM 308 may be referred to as a non-transitory computer readable medium or a computer readable storage media. A dynamic RAM embodiment of the RAM 308, likewise, may be referred to as a non-transitory computer readable medium in that while the dynamic RAM receives electrical power and is operated in accordance with its design, for example during a period of time during which the computer system 300 is turned on and operational, the dynamic RAM stores information that is written to it. Similarly, the processor 302 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of data communication service to a wireless communication device, comprising:
   receiving a first communication session initiation message by a communication gateway from a wireless communication device, wherein the first communication session initiation message provides no access point name (APN) or provides a default APN;
   based on the first communication session initiation message providing no APN or providing the default APN, sending the first communication session initiation message by the communication gateway to an APN allocation server;
   receiving the first communication session initiation message by the APN allocation server from the communication gateway;
   parsing the first communication session initiation message by the APN allocation server to determine a destination identity of the first communication session initiation message and to determine an identity of the wireless communication device;
   based on the destination identity of the first communication session initiation message and based on the identity of the wireless communication device, looking up a communication policy by the APN allocation server, wherein looking up the communication policy by the APN allocation server comprises determining a security preference of a Radio Access Network (RAN) to select a first APN;
   based on the communication policy, looking up by the APN allocation server the first APN associated with the communication policy;
   sending the first APN by the APN allocation server to the wireless communication device;
   receiving a second communication session initiation message by the communication gateway from the wireless communication device, wherein the second communication session initiation message provides the first APN; and
   routing the second communication session initiation message by the communication gateway to a communication service based on the first APN, whereby the wireless communication device is dynamically provided a communication session without statically configuring an APN in the wireless communication device.

2. The method of claim 1, further comprising:
   updating associations of communication policies to destination identities and to identities of wireless communication devices;
   receiving a third communication session initiation message by the communication gateway from the wireless communication device, wherein the third communication session initiation message provides no access point name (APN) or provides the default APN;
   based on the third communication session initiation message providing no APN or providing the default APN, sending the third communication session initiation message by the communication gateway to the APN allocation server;
   receiving the third communication session initiation message by the APN allocation server from the communication gateway;
   parsing the third communication session initiation message by the APN allocation server to determine a destination identity of the third communication session initiation message and to determine the identity of the wireless communication device;
   based on the destination identity of the third communication session initiation message, based on the identity of the wireless communication device, and based on the updating of the associations of communication policies to the destination identities and to identities of wireless communication devices, looking up a second communication policy by the APN allocation server;
   based on the communication policy, looking up by the APN allocation server a second APN associated with the second communication policy;
   sending the second APN by the APN allocation server to the wireless communication device;
   receiving a fourth communication session initiation message by the communication gateway from the wireless communication device, wherein the fourth communication session initiation message provides the second APN; and
   routing the fourth communication session initiation message by the communication gateway to a communication service based on the second APN, whereby policies for providing communication sessions to wireless communication devices is centrally managed and whereby the wireless communication device is dynamically provided a communication session without statically configuring an APN in the wireless communication device.

3. The method of claim 1, wherein before receiving the first communication session initiation message by the communication gateway from the wireless communication device, the method further comprises:
   determining whether the APN is stored locally; and
   assigning the default APN to the wireless communication device when no APN is stored locally.

4. The method of claim 1, wherein the first APN is based on either an endpoint of the first communication session or a type of the wireless communication device, wherein the type of the wireless communication device is based on a subscription plan associated with the wireless communication device.

5. The method of claim 1, wherein the wireless communication device is configured to wirelessly communicate via at least one of a 5G, a long term evolution (LTE), a code division multiple access (CDMA), or a global system for mobile communications (GSM) telecommunications protocol.

6. The method of claim 1, wherein the wireless communication device is an Internet of Things (IoT) device.

7. An access point name (APN) allocation server, comprising:
   a processor;
   a non-transitory memory; and
   an APN allocation application stored in the non-transitory memory that, when executed by the processor:
   receives a communication session initiation message from a communication gateway,
   parses the communication session initiation message to determine a destination identity of the communication session initiation message and to determine an identity of a wireless communication device,
   based on the destination identity of the communication session initiation message and based on the identity of the wireless communication device, looks up a communication policy in the non-transitory memory, based on a security preference of a Radio Access Network (RAN) and the communication policy, looks up a first APN associated with the communication policy, and sends the first APN by the APN allocation server to the wireless communication device.

8. The APN allocation server of claim 7, wherein the APN allocation application further receives a third communication session initiation message from the communication gateway, parses the third communication session initiation message to determine a destination identity of the third communication session initiation message and to determine the identity of the wireless communication device, based on the destination identity of the third communication session initiation message, based on the identity of the wireless communication device, and based on updating of associations of communication policies to destination identities and to identities of wireless communication devices, looks up a second communication policy, based on the communication policy, looks up a second APN associated with the second communication policy, and sends the second APN by the APN allocation server to the wireless communication device.

9. The APN allocation server of claim 7, wherein the destination identity of the communication session initiation message is based on an endpoint from the wireless communication device.

10. The APN allocation server of claim 7, wherein the first APN is based on a type of the wireless communication device, wherein the type of the wireless communication device is based on a subscription plan associated with the wireless communication device.

11. The APN allocation server of claim 7, wherein the first APN comprises a time-to-live value, whereby the first APN expires from use when the time-to-live value expires.

12. The APN allocation server of claim 7, wherein the destination identity is an Internet Protocol (IP) address, a fully qualified domain name (FQDN), or a uniform resource locator (URL).

13. A wireless communication device, comprising:
a radio transceiver;
a processor;
a non-transitory memory; and
a wireless communication application stored in the non-transitory memory that, when executed by the processor:

sends a first communication session initiation message via the radio transceiver to a communication gateway, wherein the first communication session initiation message comprises a destination identity and a default access point name (APN), receives a response message via the radio transceiver, wherein the response message comprises a first APN, wherein the first APN is looked-up by an APN allocation server based on a security preference of a Radio Access Network (RAN) and a communication policy, and sends a second communication session initiation message via the radio transceiver to the communication gateway, wherein the second communication session initiation message comprises the first APN, whereby the wireless communication device is dynamically provided a communication session without statically configuring an APN in the wireless communication device.

14. The wireless communication device of claim 13, wherein the wireless communication application further stores the first APN in the non-transitory memory and uses the first APN for future communication session initiation messages.

15. The wireless communication device of claim 13, wherein the wireless communication application further stores the first APN in the non-transitory memory in association with a time-to-live value for the first APN and discontinues using the first APN after the time-to-live value expires.

16. The wireless communication device of claim 13, wherein before the wireless communication application sends the first communication session, the wireless communication application further, determines whether an APN is stored locally, and assigns the default APN to the wireless communication device when no APN is stored locally.

17. The wireless communication device of claim 13, wherein the wireless communication device is an Internet of Things (IoT) device.

18. The wireless communication device of claim 13, wherein the radio transceiver is configured to wirelessly communicate via at least one of a 5G, a long term evolution (LTE), a code division multiple access (CDMA), or a global system for mobile communications (GSM) telecommunications protocol.

* * * * *